(12) United States Patent
Hui et al.

(10) Patent No.: US 8,055,213 B2
(45) Date of Patent: Nov. 8, 2011

(54) METHOD FOR DYNAMIC FREQUENCY SELECTION AND SYSTEM SUPPORTING THE SAME IN A COGNITIVE RADIO WIRELESS COMMUNICATION SYSTEM

(75) Inventors: Junhong Hui, Yongin-si (KR); Duck-Dong Hwang, Yongin-si (KR); Jae-Myeong Kim, Seoul (KR); Sang-Jo Yoo, Incheon (KR); Kyoung-Jin Cho, Incheon (KR); Jae-Hak Chung, Seoul (KR)

(73) Assignees: Samsung Electronics Co., Ltd., Suwon-si (KR); Inha-Industry Partnership Institute, Incheon (KR)

( * ) Notice: Subject to any disclaimer, the term of this patent is extended or adjusted under 35 U.S.C. 154(b) by 948 days.

(21) Appl. No.: 11/593,305

(22) Filed: Nov. 6, 2006

(65) Prior Publication Data

US 2007/0117517 A1 May 24, 2007

(30) Foreign Application Priority Data

Nov. 4, 2005 (KR) .................. 10-2005-0105706

(51) Int. Cl.
*H04B 1/034* (2006.01)
(52) U.S. Cl. .................. 455/100; 455/67.11; 455/63.1; 455/452.1; 455/434; 370/329; 370/342; 370/462
(58) Field of Classification Search .................. 455/434, 455/452.1, 509, 67.11, 63.1; 370/329, 462, 370/342
See application file for complete search history.

(56) References Cited

U.S. PATENT DOCUMENTS

| | | | |
|---|---|---|---|
| 5,247,702 A * | 9/1993 | Su et al. ................. | 455/509 |
| 6,512,927 B2 * | 1/2003 | Hunzinger ................. | 455/452.1 |
| 7,039,358 B1 * | 5/2006 | Shellhammer et al. ...... | 455/41.2 |
| 7,167,463 B2 * | 1/2007 | Alapuranen ................. | 370/338 |
| 7,266,085 B2 * | 9/2007 | Stine ................. | 370/252 |
| 7,424,268 B2 * | 9/2008 | Diener et al. ................. | 455/62 |
| 7,444,121 B2 * | 10/2008 | Brethour et al. ............. | 455/63.1 |
| 7,627,326 B1 * | 12/2009 | Miller, II ................. | 455/454 |
| 7,869,400 B2 * | 1/2011 | Hu et al. ................. | 370/329 |
| 2002/0114382 A1 * | 8/2002 | Goren et al. ................. | 375/222 |
| 2003/0169697 A1 | 9/2003 | Suzuki et al. | |
| 2003/0224787 A1 * | 12/2003 | Gandolfo ................. | 455/434 |
| 2006/0183423 A1 * | 8/2006 | Johansson et al. ........... | 455/41.2 |
| 2008/0220749 A1 * | 9/2008 | Pridmore et al. .......... | 455/414.1 |

FOREIGN PATENT DOCUMENTS

KR 10-2003-0014408 A 2/2003
WO PCT/IL01/00577 * 1/2003

OTHER PUBLICATIONS

Examination Report isued by the Korean Intellectual Property Office on Aug. 16, 2011, in corresponding Korean Patent Application No. 10-2005-0105706 (4 pages).

* cited by examiner

*Primary Examiner* — Edward Urban
*Assistant Examiner* — Ganiyu Hanidu
(74) *Attorney, Agent, or Firm* — NSIP Law

(57) ABSTRACT

Dynamic frequency selection based on CR is provided. A CR BS detects an interference-free and unused frequency band. When sensing a new BS that has great signal strength and requires the frequency band during communications in the frequency band, the CR BS releases the frequency band and dynamically selects another frequency band to avoid interference.

15 Claims, 8 Drawing Sheets

METHOD FOR DYNAMIC FREQUENCY SELECTION AND SYSTEM SUPPORTING THE SAME IN A COGNITIVE RADIO WIRELESS COMMUNICATION SYSTEM

PRIORITY

This application claims priority under 35 U.S.C. §119 to an application entitled "Method for Dynamic Frequency Selection and System Supporting the Same in a Cognitive Radio Wireless Communication System" filed in the Korean Intellectual Property Office on Nov. 4, 2005 and assigned Serial No. 2005-105706, the contents of which are incorporated herein by reference.

BACKGROUND OF THE INVENTION

1. Field of the Invention

The present invention relates generally to a method and apparatus for allocating frequency resources in a Cognitive Radio (CR) wireless communication system, and in particular, to a method and apparatus for dynamically selecting frequency resources for frequency resource allocation.

2. Description of the Related Art

The rapid development of wireless communication systems and the emergence of a variety of services are a driving force behind the increasing demand for radio resources. However, radio resources, i.e. the frequency spectrum, has come to be seen as a public asset and managed under strict governmental regulations. Multiple applications have already occupied much of commercially available spectrum, which makes it difficult to deploy a new wireless communication system.

As a solution to this problem, CR has been proposed. The CR technology senses an allocated but unused frequency band and shares the frequency band efficiently.

The CR technology is promising for application to future-generation wireless communications under study. A wireless communication system adopting CR is called a "CR system".

If a primary system is to use a frequency band that the CR system now uses, the CR system has to immediately give it to the primary system. The primary system is a licensed wireless communication system legally authorized to use the frequency.

Therefore, it is critical to continue providing an ongoing service to Customer Premise Equipments (CPEs) in the CR system, despite the above situation. A CPE is defined as a terminal capable of communicating with a CR Base Station (BS). It is a generic term referring to a device that enables a user device to connect to a communication line of a public communication service provider. The BS communicates with the CPEs via a radio interface based on the CR technology and controls communications within its coverage area.

FIG. 1 illustrates an exemplary case of local interference in a typical CR system.

Referring to FIG. 1, a CR BS 100 supports point-to-multipoint communications and manages CPEs 101 to 106 that want to receive a CR service. A primary BS 110 is within a primary system and manages primary users 111 to 116.

The primary BS 110 and the CR BS 100 are not aware of the existence of each other, although they operate in the same frequency band. The primary user 116 (user A) serviced by the primary BS 110 is free of interference from the CR BS 100.

In contrast, when the CPE 102 (user B) receives downlink data from the CR BS 100, it is affected by a downlink signal from the primary BS 110. Also, uplink data directed from user B to the CR BS 100 may interfere with user A.

If the downlink frequency band of the CR system is in a poor status or the signal strength of the primary system is greater than that of the CR system under a CR environment, communications may be impossible for the CPEs serviced by the CR system.

SUMMARY OF THE INVENTION

An object of the present invention is to substantially solve at least the above problems and/or disadvantages and to provide at least the advantages below. Accordingly, the present invention provides a method and apparatus for dynamic frequency selection in a CR wireless communication system.

The present invention provides a dynamic frequency selection method and apparatus for releasing a current frequency band, if a primary system requires usage of the frequency band in a CR wireless communication system.

The present invention provides a method and apparatus for enabling a CR wireless communication system to recognize the existence of a neighbor primary system and dynamically selecting a frequency band based on the awareness.

The present invention provides a method and apparatus for dynamic resource selection, which enable continuous provisioning of an ongoing service to a CPE located in an overlap area between the service areas of a CR system and a primary system.

The present invention provides a method and apparatus for dynamic resource selection, which recovers a CPE located in an overlap area between the service areas of a CR system and a primary system and thus placed in an outage state to a communication available state.

The present invention provides a dynamic resource selection method and apparatus for enabling a CPE, which is affected by a signal from a primary BS while the primary BS and a CR BS are not aware of each other's existence, to report the effect to the CR BS so as to render the CR BS aware of the existence of the primary BS, thereby reducing mutual interference between the primary BS and the CR BS.

The present invention provides a dynamic resource selection method and apparatus for enabling a CR system to efficiently and rapidly change a current frequency band in order to provide a service with an optimum performance to a CPE.

According to one aspect of the present invention, in a method of dynamically selecting a frequency band for use by a CPE in a CR wireless communication system, the CPE monitors reception of a signal from a neighboring primary BS in a current frequency band now in use. Upon receipt of the signal from the primary BS, the CPE sends a sensing report message including information about the current frequency band to a CR BS.

According to another aspect of the present invention, in a method of dynamically selecting a frequency band for use by a BS in a CR wireless communication system, the CR BS sends a band move message including information about an available frequency band to a CPE, when determining from a sensing report message received from the CPE that a current frequency band needs to be changed. Upon receipt of a sensing report message in response to the band move message from the CPE, the CR BS changes the current frequency band to the available frequency band.

According to a further aspect of the present invention, in a CR wireless communication system for dynamically selecting a frequency band for use in a CR scheme, a CPE monitors reception of a signal from a neighboring primary BS in a current frequency band now in use, and requests changing the current frequency band, upon receipt of the signal from the primary BS. A CR BS selects an available frequency band upon receipt of the request of changing the current frequency band from the CPE, and notifies the CPE of the selected frequency band.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Before describing the present invention, terms used herein will be defined as follows.

Current_Band_List: a list of currently available frequency bands.

Candidate_Band_List: a list of candidate frequency bands.

Sensing Report Message: a radio sensing report message sent from a CPE to a CR BS when the CPE senses a signal from another communication system or responds for a list of frequency bands.

Band Change Message: a message that the CR BS sends to the CPE in order to change a frequency band.

Band Move Message: a message that the CPE sends to the CR BS when the CPE detects an available frequency band and notifies that it will move to the detected frequency band.

Band Move ACKnowledgement (ACK) Message: a response message from the CR BS for the Band Move Message.

Ranging: a set of processes for maintaining Radio Frequency (RF) communication quality between the CR BS and the CPE. By the ranging, the CPE is connected to the network to acquire accurate transmission parameters such as time offset and power level and thus it can communicate with the CR BS.

The present invention provides a method of making a CR BS aware of the existence of a neighboring primary BS, a method of changing a current frequency band in a CR system, and a method for recovering a CPE from an outage state.

The above three methods will be described below in detail.

A. Detection of Existence of a Neighboring Primary BS

Figure 1:
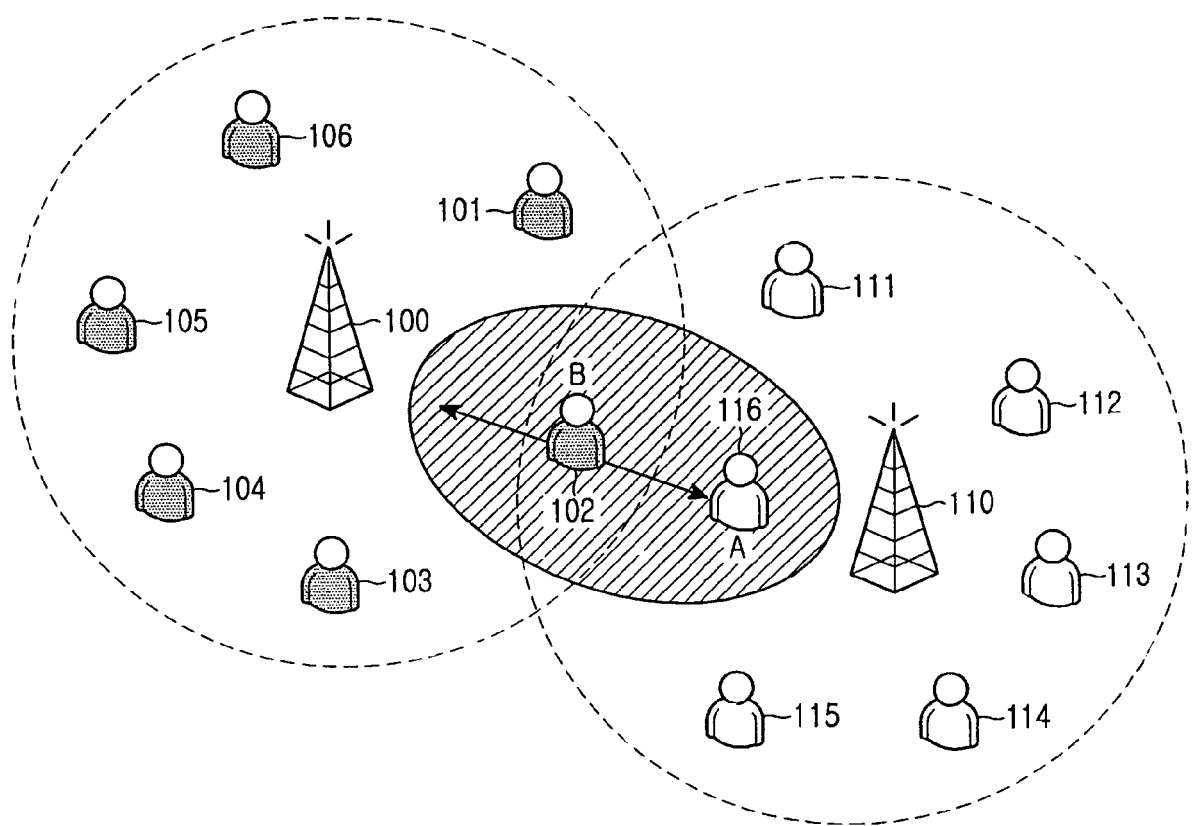
FIG. 1 illustrates an exemplary case of local interference in a typical CR wireless communication system.
Figure 2:
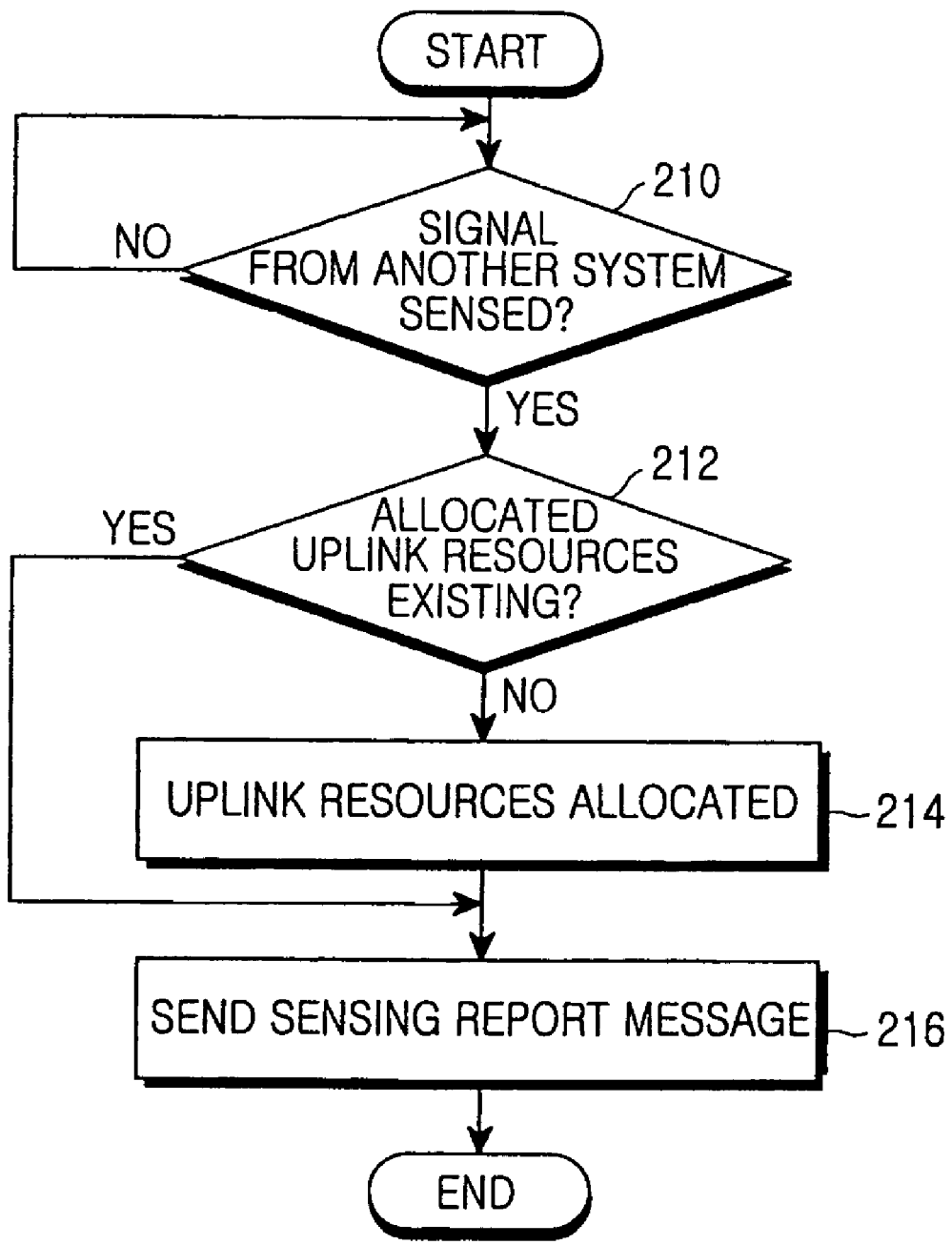
FIGS. 2 and 3 are flowcharts illustrating frequency monitoring operations for detecting the existence of a primary BS according to the present invention.
Figure 3:
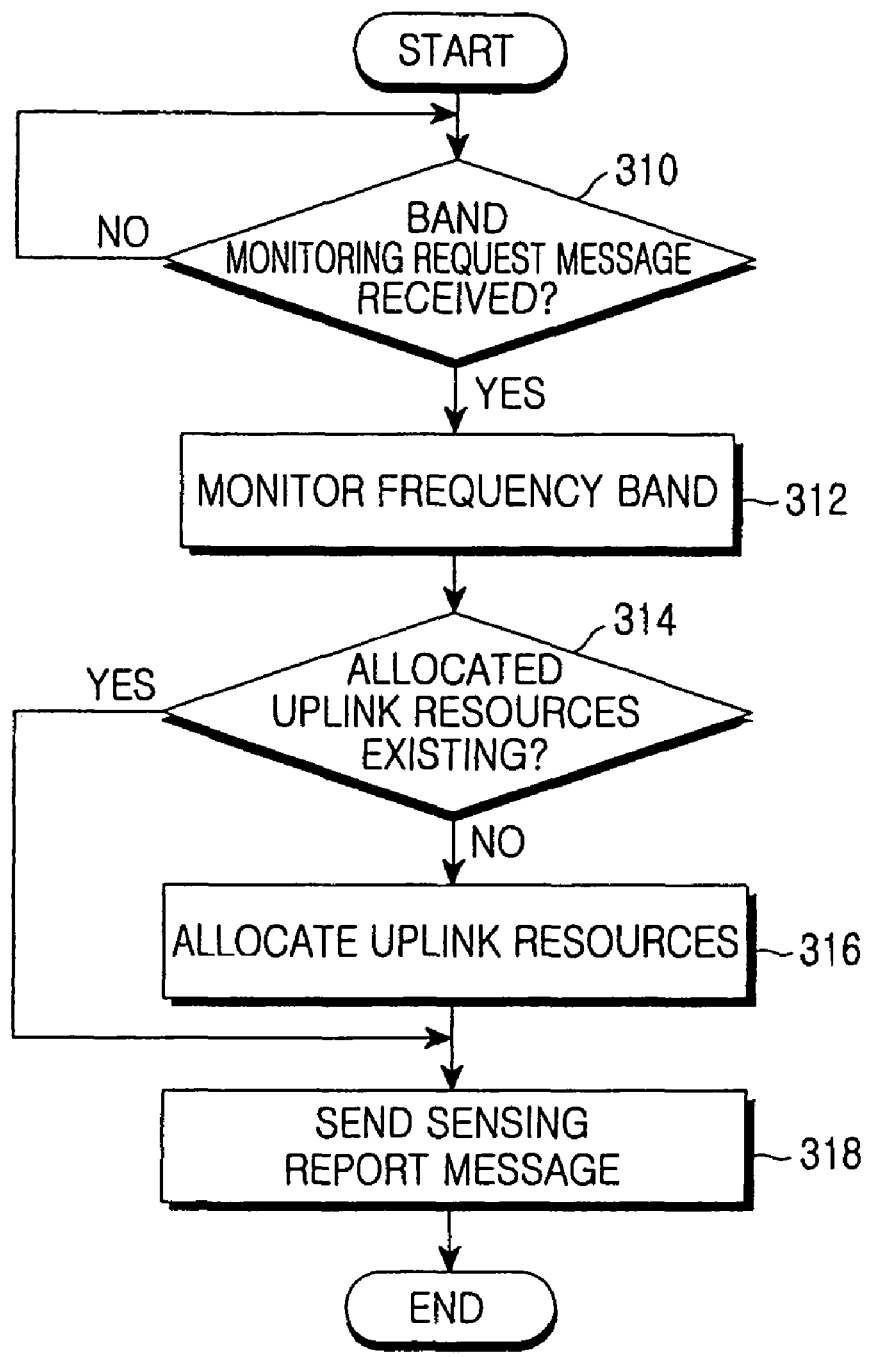

FIGS. 2 and 3 are flowcharts illustrating frequency monitoring operations for detecting the existence of a primary BS according to the present invention.

FIG. 2 illustrates a frequency monitoring operation for sensing a signal from another system and reporting the sensing to a CR BS in a CPE.

Referring to FIG. 2, the CPE monitors whether a signal from another system is sensed, i.e. whether a primary system uses a frequency band in current use for the CPE in step 210. If the primary system uses the frequency band, it interferes with the CPE.

Upon sensing the signal from the primary system, the CPE determines the presence or absence of allocated uplink resources in step 212. The uplink resources are those allocated for uplink transmission from the CPE to the CR BS.

In the presence of the allocated uplink resources, the CPE goes to step 216. In the absence of the allocated uplink resources, the CPE requests allocation of uplink resources to the CR BS in step 214. When being allocated the uplink resources, the CPE proceeds to step 216.

In step 216, the CPE reports a frequency band being interfered with by the primary system to the CR BS by a sensing report message.

FIG. 3 illustrates a frequency monitoring operation for sensing a signal from another system and reporting the sensing to the CR BS, upon request of periodic frequency band monitoring from the CR BS in a CPE.

Referring to FIG. 3, the CPE monitors reception of a band monitoring request message from the CR BS in step 310. The CR BS periodically broadcasts the band monitoring request message including information about frequency bands that the CPE is supposed to monitor.

Upon receipt of the band monitoring request message, the CPE monitors whether the frequency bands set in the received message are used by primary BSs in step 312.

After the monitoring step, the CPE determines whether there are allocated uplink resources in step 314. The uplink resources are those allocated for the CPE to send data to the CR BS.

In the presence of the allocated uplink resources, the CPE goes to step 318. In the absence of the allocated uplink resources, the CPE requests allocation of uplink resources to the CR BS in step 316. When being allocated the uplink resources, the CPE proceeds to step 318.

In step 318, the CPE reports the monitoring result to the CR BS by a sensing report message.

The CR BS is aware of the existence of a primary BS by the sensing report message in one of the above-described two frequency band monitoring procedures. Thus, the CR BS attempts to change a frequency band, thereby avoiding performance degradation caused by interference.

B. Frequency Band Selection

When the current frequency band needs to be changed in the CR system, how a frequency band is selected will be described below in great detail.

Figure 4:
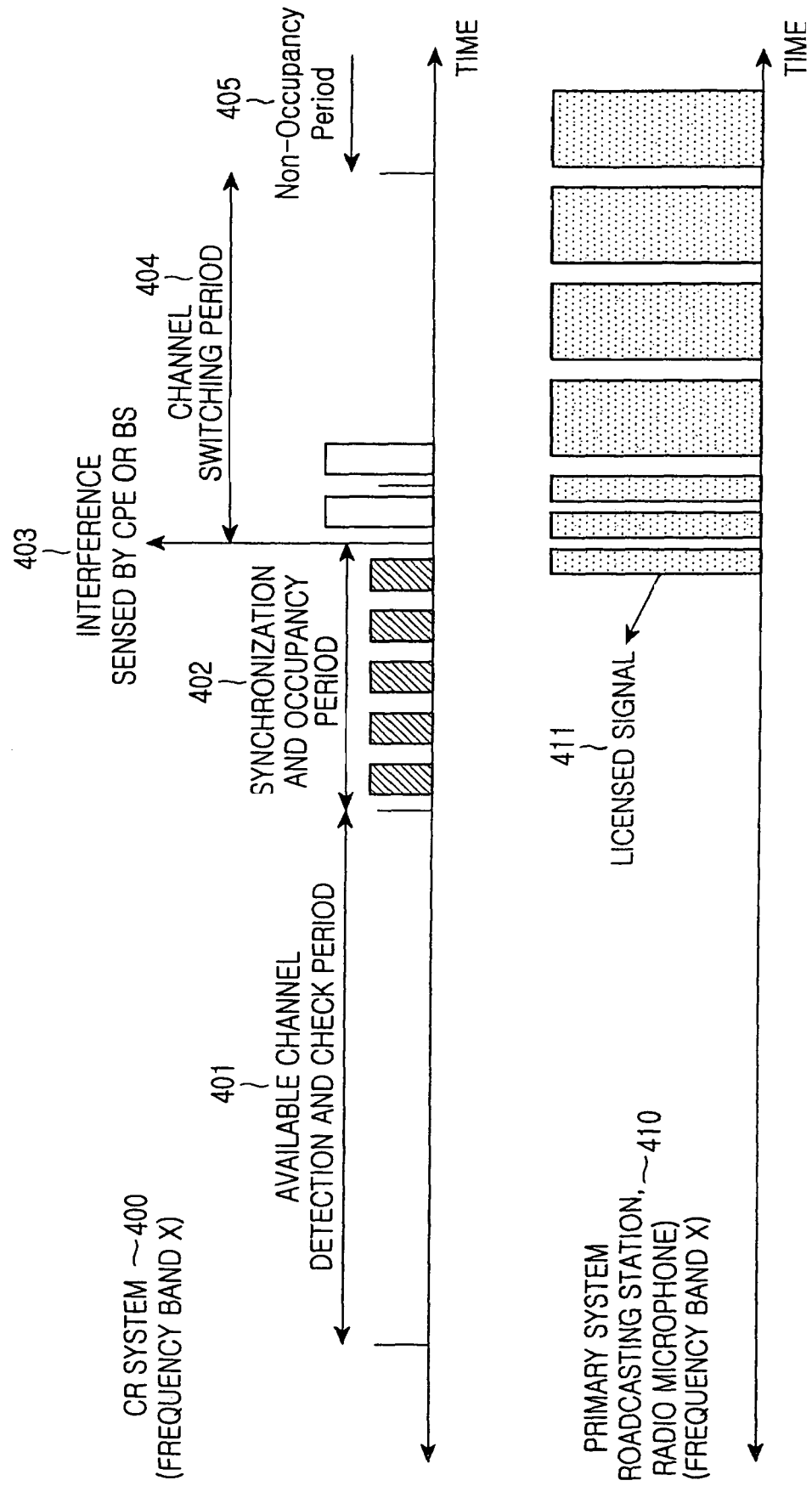
FIG. 4 is a timing diagram for dynamic frequency selection in the CR wireless communication system according to the present invention.

FIG. 4 is a timing diagram for dynamic frequency selection in the CR wireless communication system according to the present invention. The relationship between Dynamic Frequency Selection (DFS) parameters over time for a frequency band in a communication area is shown in FIG. 4.

Referring to FIG. 4, dynamic frequency selection takes place for initial ranging or frequency switching. For initial ranging, a CR system 400 monitors frequency bands and determines whether a signal from a primary system 410 has been sensed. If the signal from primary system 410 has not been sensed, CR system 400 determines that a corresponding frequency band is available. Reference numeral 401 denotes a period for which available frequency bands are detected.

The CR BS then broadcasts a list of the available frequency bands for the purpose of enabling CPEs to efficiently detect the frequency bands. There are two frequency band lists that are broadcast: Current_Band_List and Candidate_Band_List. Current_Band_List is periodically broadcast in each frame, whereas Candidate_Band_List is broadcast intermittently.

Upon receipt of the frequency band information, a CPE acquires synchronization and performs ranging with the CR BS. When ranging is completed, the CPE can communicate with the CR BS in an available frequency band. Reference numeral 402 denotes a period between the reception of the frequency band information and a time point 403 when interference from the primary system 410 is sensed.

When the CPE senses a licensed signal 411 from the primary system 410 during communications with the CR BS, it operates to switch the frequency band. That is, if the signal is sensed by the CPE or the CR system 400, a channel switching period 404 starts, for which the current frequency band is switched to another one. Since the current frequency band is not available for some time after the frequency switching, a non-occupancy period 405 is set for the frequency band.

The timing relationship illustrated in FIG. 4 shows the overall flow of the dynamic frequency selection according to the present invention. When the CR system senses a signal from the primary system or another CR system, the dynamic frequency selection is carried out to avoid interference.

Figure 5:
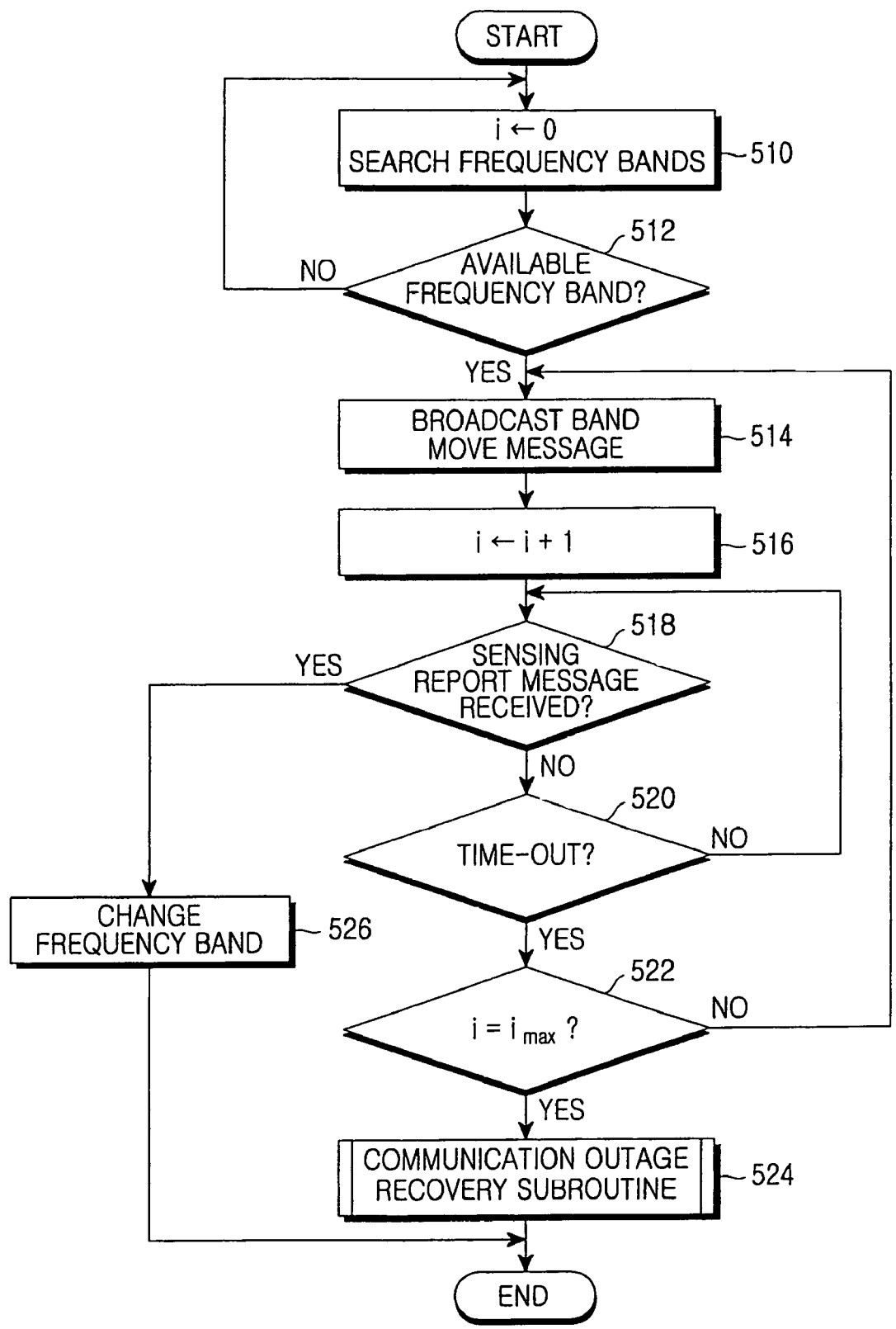
FIG. 5 is a flowchart illustrating a control operation for changing a frequency band in a CR BS according to present invention.

FIG. 5 is a flowchart illustrating a control operation for frequency band switching in the CR BS according to the present invention.

Referring to FIG. 5, the CR BS sets a variable i indicating the count of transmissions of a band change message to an initial value 0 and monitors frequency bands based on a frequency band list to move to a new frequency band in step 510.

In step 512, the CR BS determines whether there is any available new frequency band. In the absence of any available new frequency band, the CR BS continues to monitor frequency bands in step 510.

In the presence of an available new frequency band, the CR BS broadcasts a band change message to CPEs that it serves in step 514. The band change message includes downlink and uplink information about the frequency band to which the CR BS will move.

The CR BS increases the count i by 1 in step 516 and monitors reception of a sensing report message from any CPE in step 518. In step 520, the CR BS determines whether a predetermined time has elapsed (i.e. time-out).

When the CR BS receives no sensing report message until the time-out, it determines whether it has transmitted the band change message a predetermined number of times, that is, it compares i with an allowed maximum count $i_{max}$ in step 522.

If i has not reached $i_{max}$, the process returns to step 514 where the CR BS broadcasts the band change message again. Notably, the band change message is broadcast at a transmit power one level higher than the previous transmitted band change message but not exceeding a maximum power level. The higher transmit power level is for the case where some CPEs may not have received the band change message due to a weak signal strength.

Conversely, if the CR BS has sent the band change message the maximum number of times ($i=i_{max}$) it considers that a CPE which has not sent a sensing report message is in an outage state. Then the CR BS performs the communication outage recovery subroutine for the CPE in step 524.

If the CR BS has received the sensing report messages from the CPEs before the time-out in step 518, it moves to the new frequency band in step 526.

Figure 6:
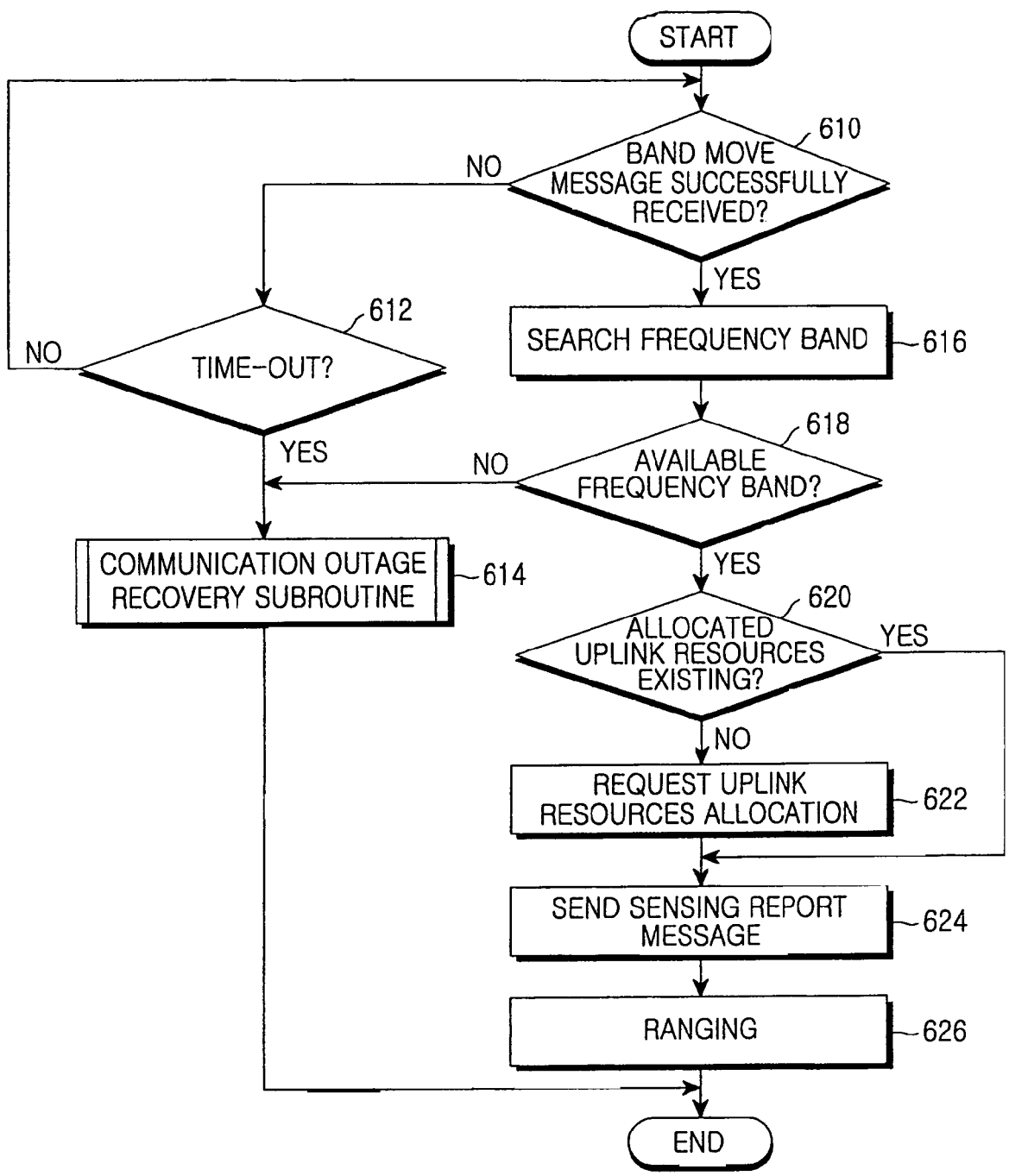
FIG. 6 is a flowchart illustrating a control operation of a CPE in correspondence with the control operation illustrated in FIG. 5.

FIG. 6 is a flowchart illustrating a control operation of a CPE in correspondence with the control operation illustrated in FIG. 5.

Referring to FIG. 6, the CPE monitors whether it has successfully received a band change message from the CR BS in step 610 and determines whether a predetermined time period has elapsed (i.e. time-out) in step 612.

If the CPE has not received the band change message successfully until the time-out, it goes to step 614. In the case where the CPE has not literally received the band change message, or has failed in successfully decoding the band change message despite successful reception, the reception is considered to be failed. In step 614, the CPE performs a communication outage recovery subroutine.

Conversely, if the CPE has successfully received the band change (move) message before the time-out, it searches the frequency band set in frequency band information of the frequency band message in step 616.

In step 618, the CPE determines whether the frequency band is available. If the frequency band is not available, the CPE performs the communication outage recovery subroutine in step 614.

If the frequency band is available, the CPE determines the presence of allocated uplink resources in step 620. The uplink resources are those allocated to the CPE so that it can send a sensing report message to the CR BS.

In the presence of the allocated uplink resources, the CPE proceeds to step 624. In the absence of the allocated uplink resources, the CPE requests allocation of uplink resources to the CR BS in step 622. After allocating the uplink resources, the CPE goes to step 624.

In step 624, the CPE reports that the frequency band is available to the CR BS by the sensing report message. Then the CPE performs ranging in step 626.

C. Communication Outage Recovery

A CPE placed in an outage state due to a signal received from another system in a current frequency band recovers from the outage to a communication available state as follows.

When the CPE is interfered with by a signal from another system in the current frequency band, it immediately reports the frequency band to the CR BS by a sensing report message. The CPE then awaits reception of band move message from the CR BS.

If the CR BS fails to receive the sensing report message or the CPE fails to receive the band move message, the CPE cannot move to another frequency band and thus is placed in an outage state. In the case where the CPE does not successfully decode a downlink signal due to severe interference, it may not receive the band move message even though the CR BS sends it successfully.

The outage occurs mainly when the condition of an uplink or downlink frequency band is poor or the transmit power (i.e. signal strength) of the primary system is higher than that of the CR system.

Figure 7:
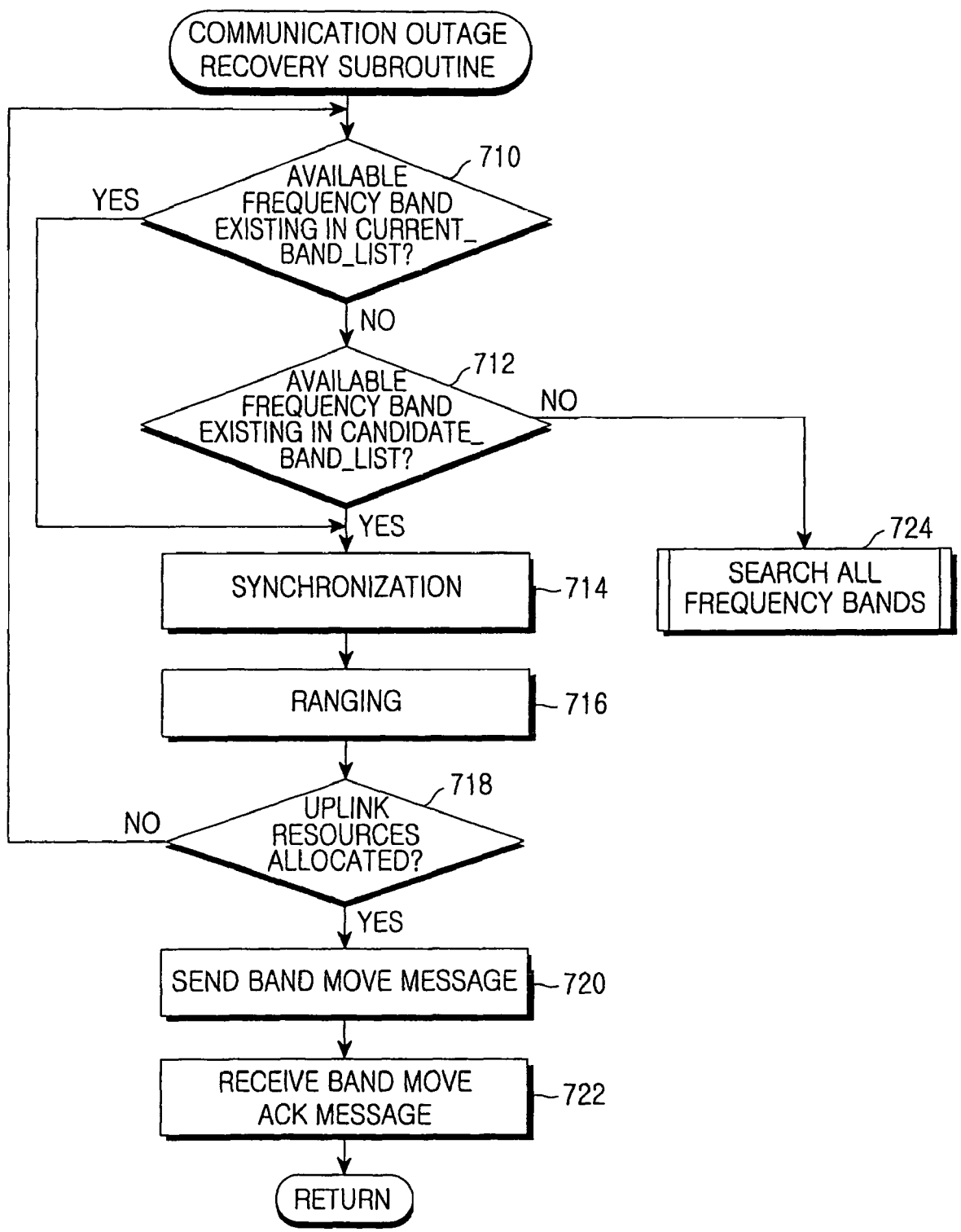
FIG. 7 is a flowchart illustrating a communication outage recovery subroutine in the CPE according to the present invention.

FIG. 7 is a flowchart illustrating a communication outage recovery subroutine in the CPE according to the present invention.

Referring to FIG. 7, the CPE does not receive data successfully from the CR BS due to interference in a current downlink frequency band and thus selects another frequency band in steps 710 and 712. Specifically, the CPE monitors the existence of an available frequency band among the frequency bands listed in Current_Band_List. If no available frequency band exists in the list, the CPE checks whether any of the frequency bands listed in Candidate_Band_List is available in step 712.

However, if there remains no available frequency band in either of the lists, the CPE searches all frequency bands for connection re-setup in step 724.

When selecting an available frequency band in steps 710 and 712, the CPE acquires synchronization to the selected frequency band in step 714 and performs ranging to request uplink resource allocation by which to send a band move message in step 716. In step 718, the CPE monitors allocation of uplink resources from the CR BS. If the CPE fails to be allocated uplink resources from the CR BS after a few attempts for a predetermined time period, it returns to step 710 or 712. The above operation is repeated until there remains no available frequency band in either Current_Band_List or Candidate_Band_List.

If the CPE is allocated uplink resources from the CR BS, it sends the band move message to the CR BS, reporting that it will move to the selected frequency band in step 720 and receives a band move ACK message from the CR BS in step 722. The CPE then moves to the selected frequency band, thus having recovered from the outage state.

Figure 8:
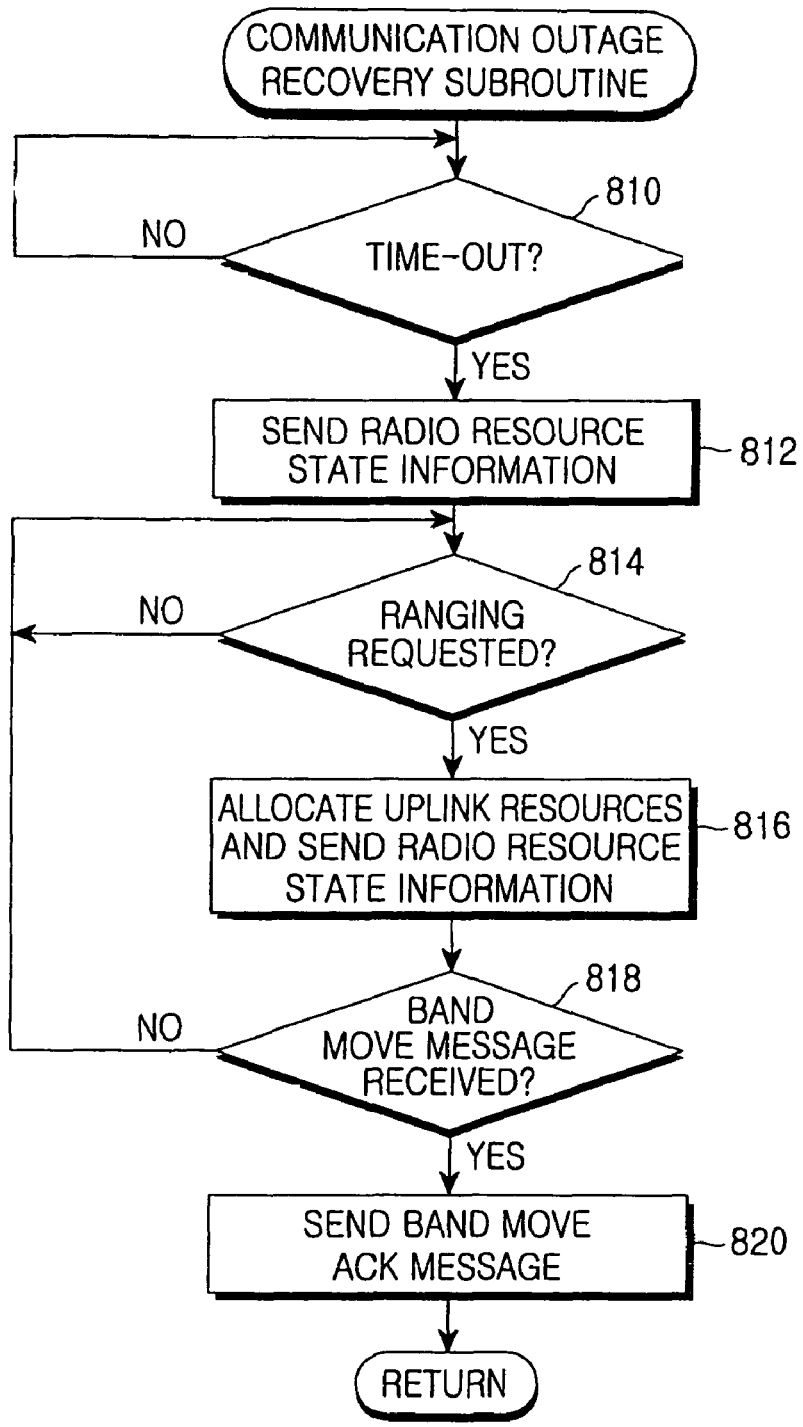
FIG. 8 is a flowchart illustrating a communication outage recovery subroutine in the CR BS in correspondence with the procedure illustrated in FIG. 7.

FIG. 8 is a flowchart illustrating a communication outage recovery subroutine in the CR BS in correspondence with the procedure illustrated in FIG. 7.

Referring to FIG. 8, when the CR BS determines that a CPE is in an outage state, it awaits reception of a band move message in another frequency band from the CPE for a predetermined time period in step 810.

In step 812, the CR BS broadcasts radio resource state information so that the CPE can acquire uplink resources in which to send the band move message. The CR BS monitors reception of a ranging request from the CPE in step 814.

Upon receipt of the ranging request, the CR BS allocates uplink resources to the CPE and broadcasts radio resource state information including information about the allocated uplink resources in step 816 and monitors reception of the band move message from the CPE in step 818. If the CR BS has not received the band move message, it repeats steps 814 and 816.

Upon receipt of the band move message, the CR BS replies with a band move ACK message to the CPE in step 820.

In accordance with the present invention as described above, a CR system is aware of the existence of a neighboring primary system efficiency and attempts to change to an available frequency band, thereby avoiding signal interference between the mobile systems.

The frequency band switching can be performed rapidly by dynamic frequency selection using an intermittent candidate frequency band list as well as a current frequency band list. Furthermore, a communication outage recovery mechanism is carried out in case of an outage. As a consequence, the CR system can provide a service seamlessly with optimum performance to users.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method of dynamically selecting a frequency band in a Customer Premise Equipment (CPE) in a Cognitive Radio (CR) wireless communication system, the method comprising:

receiving, from a CR base station (CR BS), a band monitoring request message including information identifying frequency bands that the CPE is to monitor;

monitoring, at the CPE, reception of a signal from a neighboring primary Base Station (BS) in a current frequency band now in use, based on the band monitoring request message;

receiving, at the CPE, a current frequency band list including currently available frequency bands, the current frequency band list being broadcasted periodically by the CR BS;

receiving, at the CPE, a candidate frequency band list including candidate frequency bands, the candidate frequency band list being broadcasted intermittently by the CR BS; and sending a sensing report message including information about the current frequency band to the CR BS, wherein the available frequency bands include frequencies on which a signal from a primary system has not been sensed.

2. The method of claim 1, further comprising:

receiving a band monitoring request message from the CR BS;

monitoring reception of a signal from the primary BS in frequency bands indicated by the band monitoring request message; and sending a sensing report message including a result of the monitoring to the CR BS.

3. The method of claim 1, further comprising:

receiving a band change message broadcast from the CR BS, when receiving a signal from the primary BS in the current frequency band;

monitoring reception of a signal from the primary BS in a new frequency band indicated by the band change message;

sending a sensing report message reporting that the CPE will move to the new frequency band, if the signal from the primary BS is not received in the new frequency band; and moving from the current frequency band to the new frequency band.

4. The method of claim 3, further comprising:

detecting an available frequency band, upon receipt of a signal from the primary BS in the new frequency band indicated by the band change message;

sending a band move message including information about the detected frequency band to the CR BS;

receiving a band move acknowledgement (ACK) message from the CR BS in response to the band move message; and moving from the current frequency band to the detected frequency band.

5. The method of claim 4, wherein the search step comprises:

detecting an available frequency band among frequency bands listed in the current frequency band list broadcast in each frame from the CR BS; and detecting an available frequency band among frequency bands listed in the candidate frequency band list broadcast intermittently from the CR BS, if no available frequency bands are detected in the current frequency band list.

6. A method of dynamically selecting a frequency band in a Base Station (BS) in a Cognitive Radio (CR) wireless communication system, the method comprising:

transmitting, to a Customer Premise Equipment (CPE), a band monitoring request message including information identifying frequency bands that the CPE is to monitor;
  broadcasting periodically, at the CR BS, a current frequency band list including currently available frequency bands;
  broadcasting intermittently, at the CR BS, a candidate frequency band list including candidate frequency bands;
  sending a band change message including information about an available frequency band to the CPE, when determining from a sensing report message received from the CPE that a current frequency band needs to be changed; and
  changing, at the CR BS, the current frequency band to the available frequency band, upon receipt of a sensing report message in response to the band change message from the CPE,
  wherein the available frequency bands include frequencies on which a signal from a primary system has not been sensed.

7. The method of claim 6, further comprising:
  receiving a band move message from the CPE; and
  sending a band move acknowledgement (ACK) message to the CPE, the band move ACK message acknowledging movement to a new frequency band indicated by the band move message.

8. The method of claim 7, wherein the new frequency band indicated by the band move message sent by the CPE is determined from frequency bands listed in the current frequency band list broadcast in each frame and frequency bands listed in the candidate frequency band list.

9. A Cognitive Radio (CR) wireless communication system for dynamically selecting a frequency band for use in a CR scheme, the system comprising:
  a Customer Premise Equipment (CPE) to receive a band monitoring request message including information identifying frequency bands that the CPE is to monitor, to monitor reception of a signal from a neighboring primary Base Station (BS) in a current frequency band now in use based on the received band monitoring request message, to receive a current frequency band list and a candidate frequency band list, and to request a change of the current frequency band; and
  a CR BS to transmit the band monitoring request message, to broadcast periodically the current frequency band list including currently available frequency bands, to broadcast intermittently the candidate frequency band list including candidate frequency bands, to select an available frequency band upon receipt of the request of changing the current frequency band from the CPE, and to notify the CPE of the selected frequency band,
  wherein the available frequency bands include frequencies on which a signal from a primary system has not been sensed.

10. The CR wireless communication system of claim 9, wherein the CPE receives the band monitoring request message from the CR BS, monitors reception of a signal from the primary BS in the frequency band indicated by the band monitoring request message, and reports a result of the monitoring to the CR BS.

11. The CR wireless communication system of claim 9, wherein the CR BS sends information about the selected frequency band to the CPE, and changes the current frequency band to the selected frequency band, upon receipt of a report indicating that the selected frequency band is available from the CPE.

12. The CR wireless communication system of claim 11, wherein the CPE receives the information about the selected frequency band from the CR BS, reports to the CR BS that the selected frequency band is available, if the CPE does not receive a signal from the primary BS in the selected frequency band, and changes the current frequency band to the selected frequency band.

13. The CR wireless communication system of claim 12, wherein the CR BS broadcasts the current frequency band list in each frame and the candidate frequency band list intermittently.

14. The CR wireless communication system of claim 13, wherein the CPE receives the current frequency band list and the candidate frequency band list, requests movement to an available frequency band in the current frequency band list to the CR BS, if the selected frequency band is in use for the primary BS, and changes from the current frequency band to the available frequency band, if the CR BS allows the movement to the available frequency band.

15. The CR wireless communication system of claim 14, wherein the CPE requests movement to an available frequency band in the candidate frequency band list to the CR BS, if there is no available frequency band in the current frequency band list, and changes from the current frequency band to the available frequency band, if the CR BS allows the movement to the available frequency band.

* * * * *